US006705158B1

(12) United States Patent
Louden

(10) Patent No.: US 6,705,158 B1
(45) Date of Patent: Mar. 16, 2004

(54) HOT WIRE ANEMOMETER WITH EXTENDABLE PROBE

(76) Inventor: Phil Louden, 2 Wainwright Close, Weston Super Mare (GB), BS22 0QS ( * ) Notice: Subject to any disclaimer, the term of this patent is extended or adjusted under 35 U.S.C. 154(b) by 0 days.

(21) Appl. No.: 10/021,146

(22) Filed: Dec. 12, 2001

Related U.S. Application Data

(60) Provisional application No. 60/257,927, filed on Dec. 22, 2000.

(51) Int. Cl.[7] .............................. G01F 13/00; G01P 5/06
(52) U.S. Cl. ................................ 73/170.12; 73/861.85; 73/866.5
(58) Field of Search ........................... 73/170.12, 202.5, 73/170.15, 170.16, 170.11, 203, 866.5, 204.11–204.17, 861.65, 861.16, 861.85, 204.22; 324/115

(56) References Cited

U.S. PATENT DOCUMENTS

| | | | | |
|---|---|---|---|---|
| 4,584,676 A | * | 4/1986 | Newman | ................. 367/108 |
| 4,788,869 A | * | 12/1988 | Li | ........................ 73/861.71 |
| 5,162,725 A | * | 11/1992 | Hodsen et al. | .............. 324/115 |
| 5,595,088 A | * | 1/1997 | Horner | ..................... 73/290 V |
| 6,156,035 A | * | 12/2000 | Songer | ....................... 606/45 |

* cited by examiner

*Primary Examiner*—Edward Lefkowitz
*Assistant Examiner*—Jermaine Jenkins

(57) ABSTRACT

A hot wire anemometer comprising a support member having a data processing system, probe head with a hot wire sensor and an ambient temperature sensor and an extendable portion having conductors therein for transfer of collected data and command data between the data processing system in the handle and the hot wire and ambient sensors in the probe head, thus conveniently allowing the probe head to be extended far from the support member and into a desired test area for accurate data collection to determine the velocity of fluid flow.

23 Claims, 8 Drawing Sheets

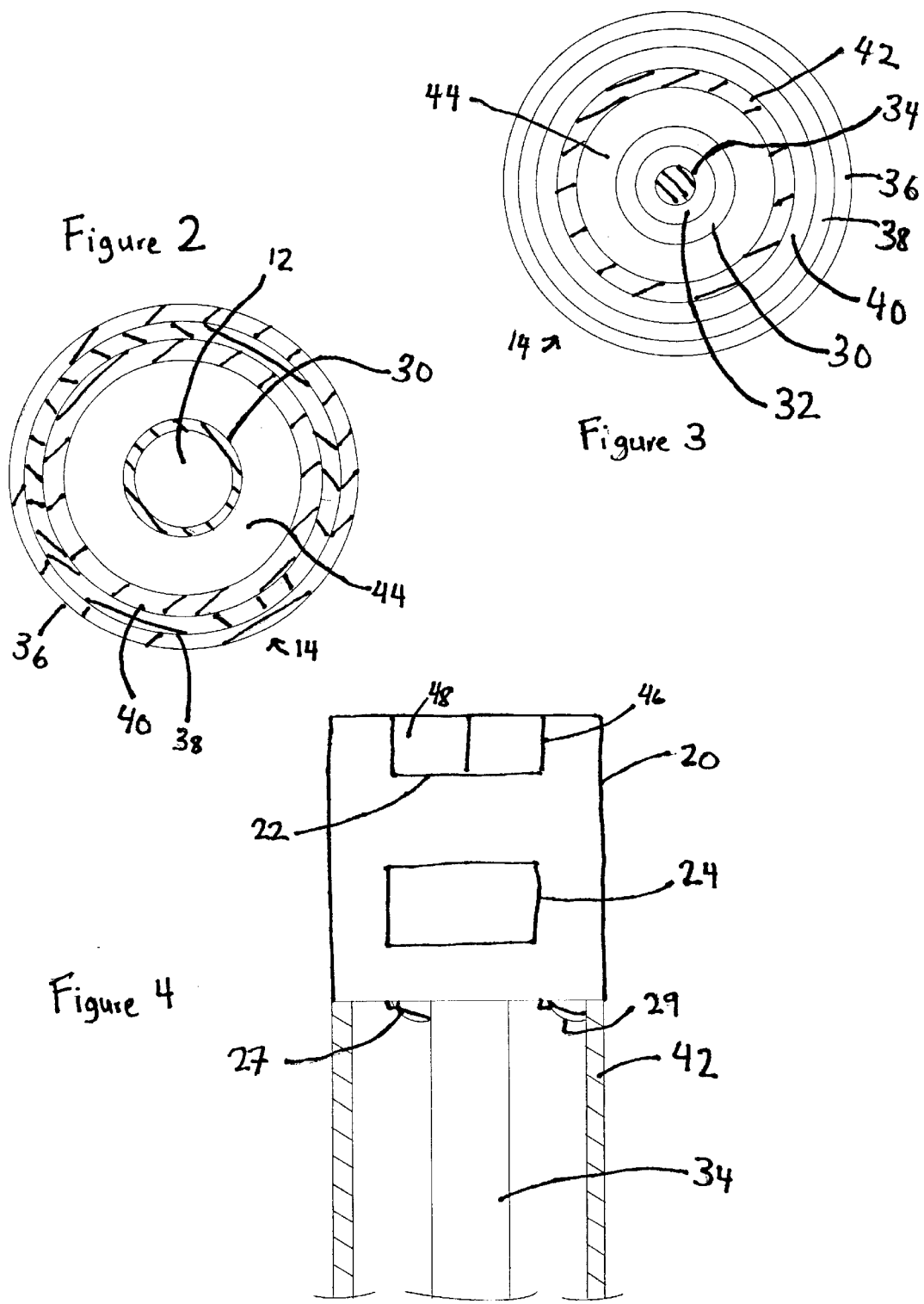

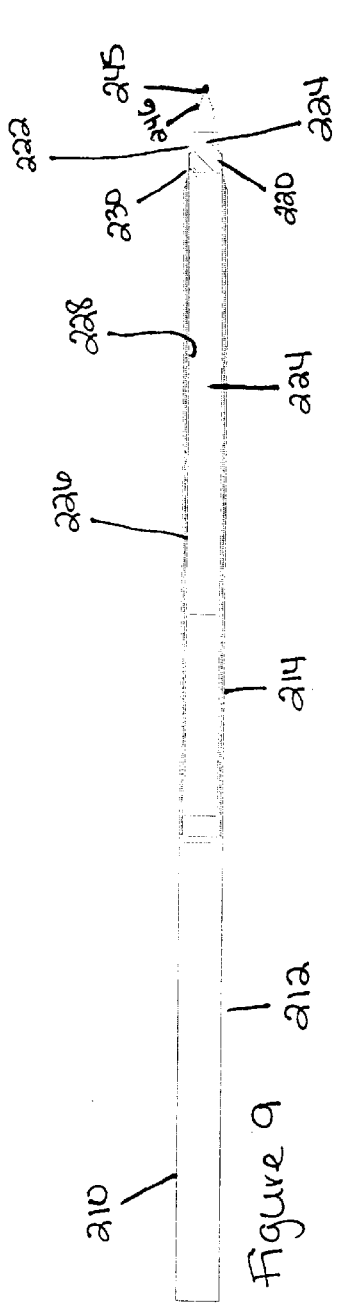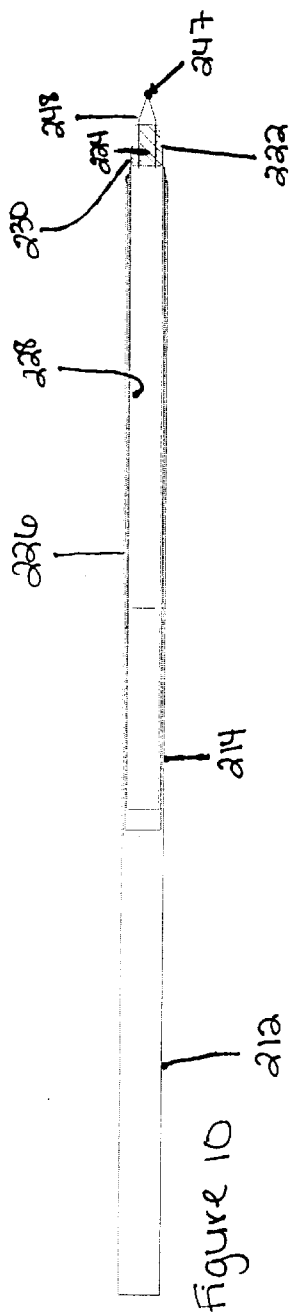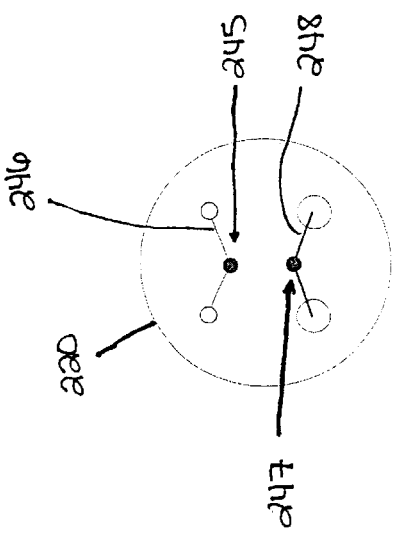

HOT WIRE ANEMOMETER WITH EXTENDABLE PROBE

CROSS-REFERENCE TO RELATED APPLICATIONS

The present application is a utility patent application based upon earlier filed U.S. Provisional Application Ser. No. 60/257,927 filed Dec. 22, 2000, the disclosure of which earlier filed application is hereby incorporated by reference and the priority of which earlier filed United States Provisional Application is hereby claimed.

STATEMENT REGARDING FEDERALLY SPONSORED RESEARCH OR DEVELOPMENT (Not Applicable.)

BACKGROUND OF THE INVENTION

The present invention relates to processes and apparatus for measuring fluid flow, and more particularly, to a hot wire anemometer.

An anemometer is an instrument which measures the velocity of the flow of fluids, such as air or other gases, and in some cases of liquids. While mechanical anemometers, such as cup anemometers are useful for measuring wind speed, hot-wire anemometers are required for more technical applications.

Hot-wire anemometers function as thermal transducers which are capable of sensing point flow velocity by means of temperature variations using a heated resistive wire with a nonzero temperature coefficient of resistance. When the electrically heated wire is placed in a flow of fluid, heat is taken away by flow-induced forced convection, i.e., the wire is cooled by the fluid flow. Depending upon the operational mode used, e.g. constant current or constant temperature, either the resistance or the voltage output drop across the wire is then a function of the flow velocity. Thus, in the case of a constant current device, greater flow results in a greater temperature drop over time.

Hot wire anemometers are commonly used to measure air velocity in the vicinity of ventilation ducts in occupied buildings. Ventilation ducts are often mounted near the room ceiling or in an otherwise elevated location. Therefore, for applications such as these, the hot wire anemometer must be extended to reach these areas in order to obtain an accurate measurement. There are a number of products on the market that attempt to accomplish this task by using either telescopic heads or extension handles. However, these devices are not ideal.

One of the most difficult problems in manufacturing a telescopic probe is that the electronics required to interface with the sensors require several electrical conductors, which are most commonly electrically conductive wires, to pass inside the telescopic section. As the head is rotated, the wires twist, and thus, 360° rotation is not possible. Also, when the telescopic section is collapsed, the wires also have to retract without snagging. Some manufacturers have attempted to overcome this problem by making telescoping anemometers which have a cable that is not fixed at the probe handle end, with the objective of making the cable free to travel up and down the inside of the telescopic section. These devices require a special cable to be used. The cable is typically stiff and not easy to manage, which also, among other things, limits its length and requires an additional electronics module to interface to the measuring instrument.

BRIEF SUMMARY OF THE INVENTION

The present invention provides a solution to the problems and inconveniences associated with prior art anemometers. The present invention is directed to an anemometer comprising a support member with an extendable probe portion having two ends and one or more conductors in the extendable probe portion for electrical flow and transfer of data between a data gathering system located at one end of the extendable probe portion and a data processing and command system located in the support member connected to the other end of the extendable probe portion, or in a remote source such as a personal computer.

The preferred embodiment of the inventive anemometer includes a handle and probe. The probe comprises a coaxial telescoping extension having two concentric telescoping sections which are electrically-insulated from each other. Data is gathered by sensors at the probe head end and transferred to a data processor in the handle through the telescoping sections, which comprise the necessary conductors for data and power transfer between the probe head and handle. The probe may be fully rotated and extended to obtain data without being physically obstructed.

BRIEF DESCRIPTION OF THE SEVERAL VIEWS OF THE DRAWING

One or more embodiments of the invention and of making and using the invention, as well as the best mode contemplated of carrying out the invention, are described in detail below, by way of example, with reference to the accompanying drawings, in which:

FIG. 2 is a cross-sectional view of the embodiment of the inventive device shown in FIG. 1 along line 2—2 of FIG. 1;

FIG. 3 is a cross-sectional view of the embodiment of the inventive device shown in FIG. 1 along line 3—3 of FIG. 1;

FIG. 4 is a side view partially in cross section of the probe head of the inventive device;

FIG. 9 is a top view partially in cross section of an alternative embodiment of the inventive device;

FIG. 10 is a bottom view partially in cross section of the embodiment illustrated in FIG. 9;

FIG. 11 is an enlarged end view of the sensor head of the embodiment illustrated in FIGS. 9 and 10;

DETAILED DESCRIPTION OF THE INVENTION

Figure 1:
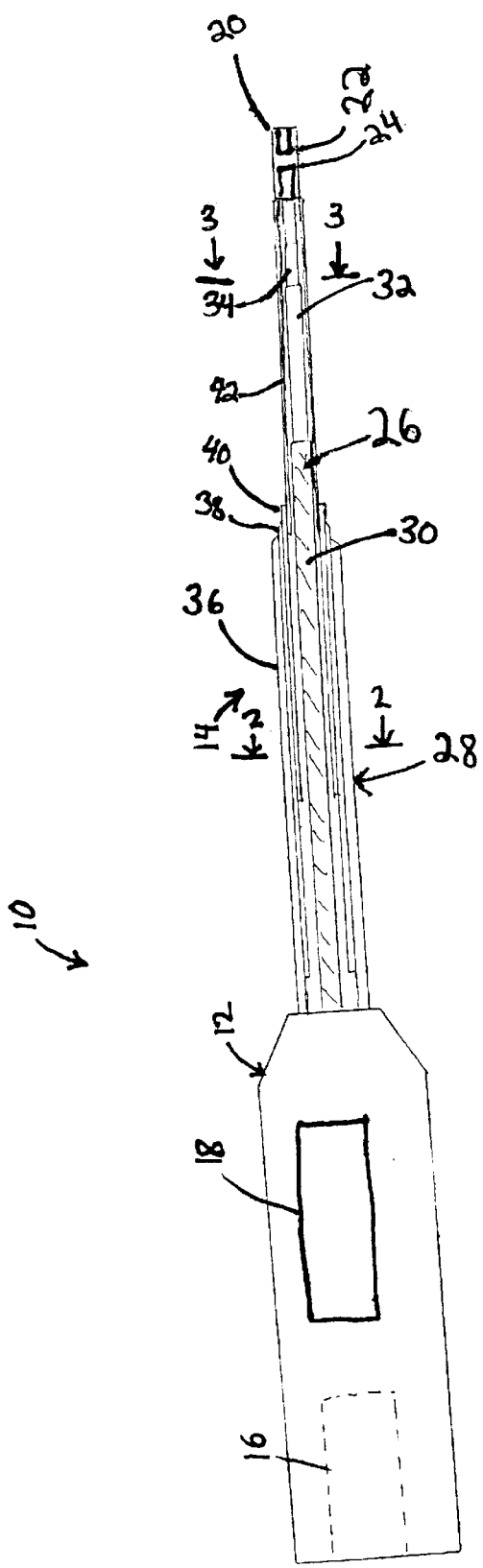
FIG. 1 is a side view partially in cross section of an embodiment of the inventive device.

The following more detailed description of the invention is intended to be read in the light of, or in context with, the preceding summary and background descriptions. Unless otherwise apparent, or stated, directional references, such as "up", "down", "left", "right", "front" and "rear", are intended to be relative to the orientation of a particular embodiment of the invention as shown in the first numbered view of that embodiment. Also, a given reference numeral indicates the same or a similar structure when it appears in different figures.

Anemometer 10, as illustrated in FIG. 1, has handle 12 and extendable portion 14. A battery and its compartment 16 and electronics assembly 18 are located in handle 12. Probe head 20, with sensor assembly 22 and a second electronics assembly 24 inside, is secured in anemometer 10 at the end of extendable portion 14. Extendable portion 14 has outer telescoping section 28 and inner telescoping section 26. Outer telescoping section 28 is electrically grounded and inner telescoping section 26 is electrically isolated from outer section 28, thus providing for conduction of electricity through extendable portion 14 and sensor assembly 22.

Both inner telescoping section 26 and outer telescoping section 28 are made up of a plurality of annular pipe-like legs that allow the sections to extend and retract to reach into a flow of fluid. In this embodiment, inner section 26 has annular legs 30, 32 and 34. Outer section 28 has annular legs 36, 38, 40 and 42. Annular legs 30, 32 and 34 have smaller diameters than legs 36, 38, 40 and 42. However, each annular leg 30, 32, 34, 36, 38, 40 and 42 differs in diameter ranging from the smallest being leg 30 to the largest being leg 42, thus permitting legs 30, 32, 34, 36, 38, 40 and 42 to fit within one another. Preferably, the change in diameter between the legs is constant, except for difference in diameter between leg 30, which is the largest of any leg in inner section 26, and leg 42, the smallest of any leg in outer section 28. Hence, there is a gap 44 between inner section 26 and outer section 28, as illustrated in FIGS. 2 and 3, which depict cross-sections of extendable portion 14 at the two locations shown in FIG. 1.

Legs 30, 32, 36, 38 and 40 have upper rims that extend inwardly, and legs 32, 34, 38, 40 and 42 have lower rims that extend outwardly, thus interlocking when telescoping sections 26 and 28 are fully extended to prevent legs 30, 32, 34, 36, 38, 40 and 42 from being pulled apart. Annular leg 34 of inner section 26 and annular leg 42 of outer section 28 are mechanically secured to probe head 20 at one end. Legs 34 and 42 are also electrically connected to a respective one of the two electrical terminals which serve as the output of sensor and electronics assembly 22 and 24, respectively.

Annular leg 30 of inner section 26 and annular leg 36 of outer section 28 are secured to handle 12 at one end. Therefore, when probe head 20 is extended, it pulls annular leg 34, which extends from inside leg 32. When the length of leg 34 is fully extended from inside leg 32, the lower rim on leg 34 contacts the upper rim on leg 32 and pulls leg 32 from inside leg 30. Legs 36, 38, 40 and 42 of outer telescoping section 28 extend in the same manner as legs 30, 32 and 34 of inner section 26.

Inner section 26 and outer section 28 are electrically connected to the probe head via leads 27 and 29, respectively, as illustrated in FIG. 4.

In this embodiment, sensor assembly 22 in probe head 20 includes hot wire sensor 46, comprising the hot wire and a device for measuring its change in temperature, and temperature sensor 48, such as a thermocouple, for measuring the surrounding air temperature. The temperature reading from temperature sensor 48 is used predominantly for adjusting and calibrating hot wire sensor 46.

The hot wire is stretched to be self-supporting between a pair of supports within hot wire sensor 46 for exposure of the hot wire to the gas stream. The material of which the hot wire is formed has a temperature coefficient sufficiently large so that the cooling effects of flowing gas may be readily detected by the temperature measuring device included in hot wire sensor 46. For fast temperature response, the hot wire is very thin, typically between about 2 and about 20 microns to provide a sensing area large relative to its mass. The material is chosen to be stable throughout the operating temperature range of the hot wire and chemically non-reactive with the gases in the fluid stream to which it is exposed. Preferably, the heat capacity is low and the thermal conductivity is high, factors which contribute to rapid response. Suitable materials for hot wires that are typically used include certain metals and metal alloys, in particular tungsten and platinum alloys.

Figure 5:
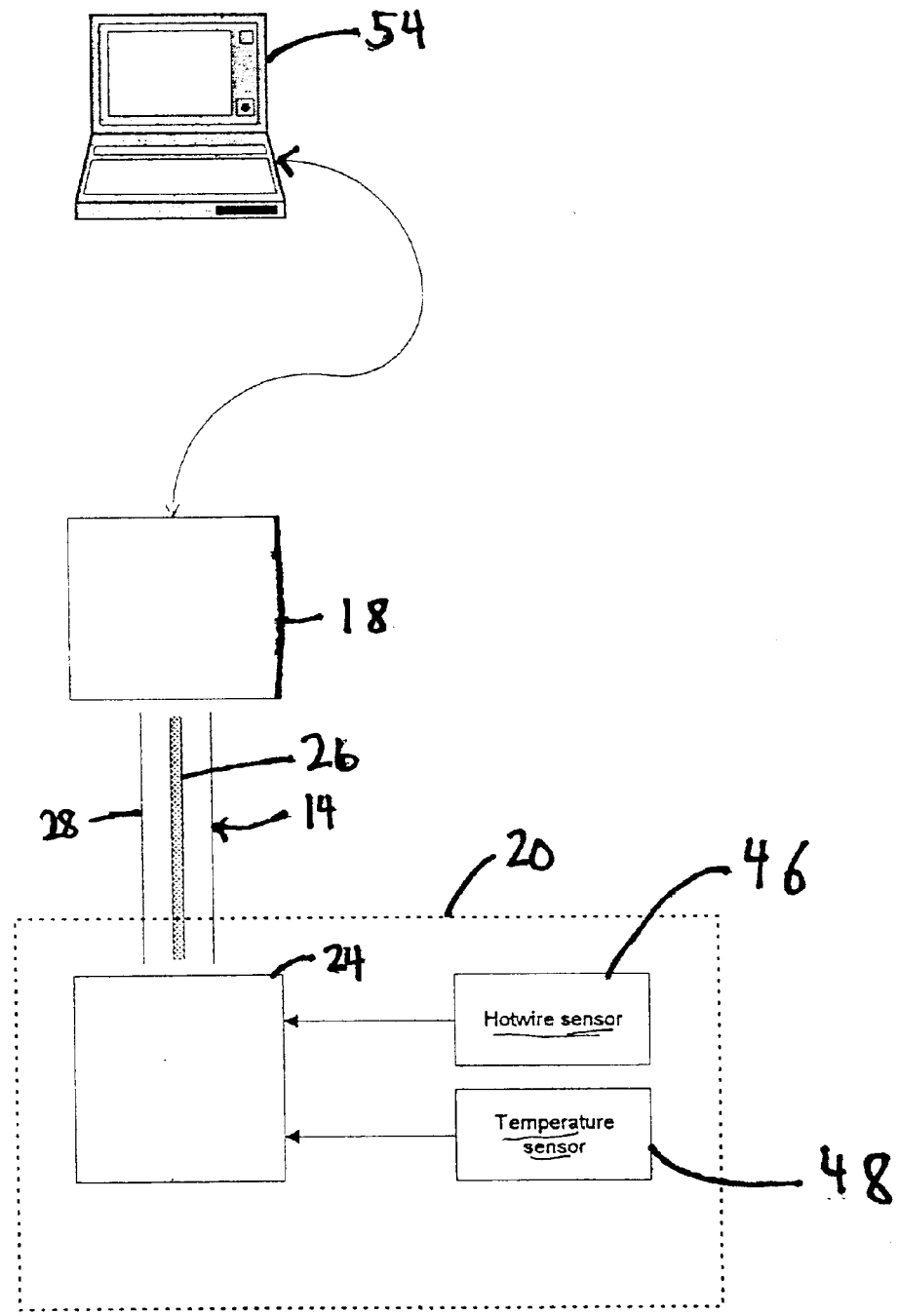
FIG. 5 is a functional diagram for the embodiment of the inventive device shown in FIG. 1.

As illustrated in FIG. 5, electronics assemblies 18 and 24, located in handle 12 and probe head 20, respectively, comprise the electronics and/or software needed for data acquisition, conversion, processing and transfer from the sensors (i.e., hot wire sensor 46 and temperature sensor 48) to a computer.

Figure 6:
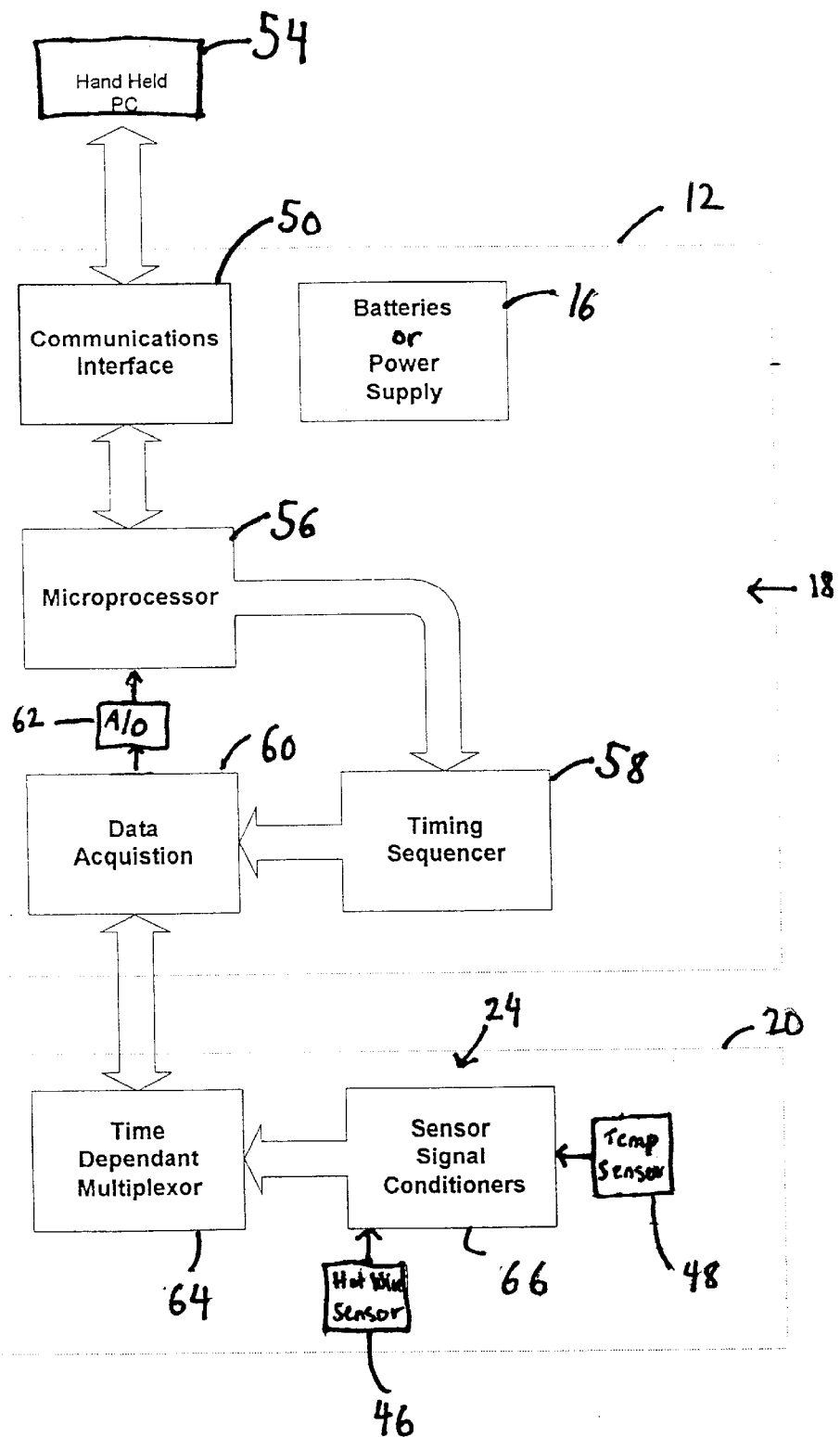
FIG. 6 is a second functional diagram of the electronics assemblies for the embodiment of the inventive device shown in FIG. 1.

As illustrated in FIG. 6, electronics assembly 18 comprises communications interface 50, typically a pair of multi-conductor electrical connectors which serve as a port. Interface 50 allows data captured by microprocessor 56 to be transferred to a remote source, such as a hand-held or personal computer 54, via cable, infrared or wireless transmission. Microprocessor 56 controls all the basic functions of anemometer 10. Anemometer 10 may also be directly controlled by computer 54 through interface 50 or other connection with electronics assembly 18.

Microprocessor 56 operates timing sequencer 58 which generates the necessary timing pulses for the various anemometer functions which includes setting the timing and reading sequence required to take readings from sensors 46 and 48.

Figure 7:
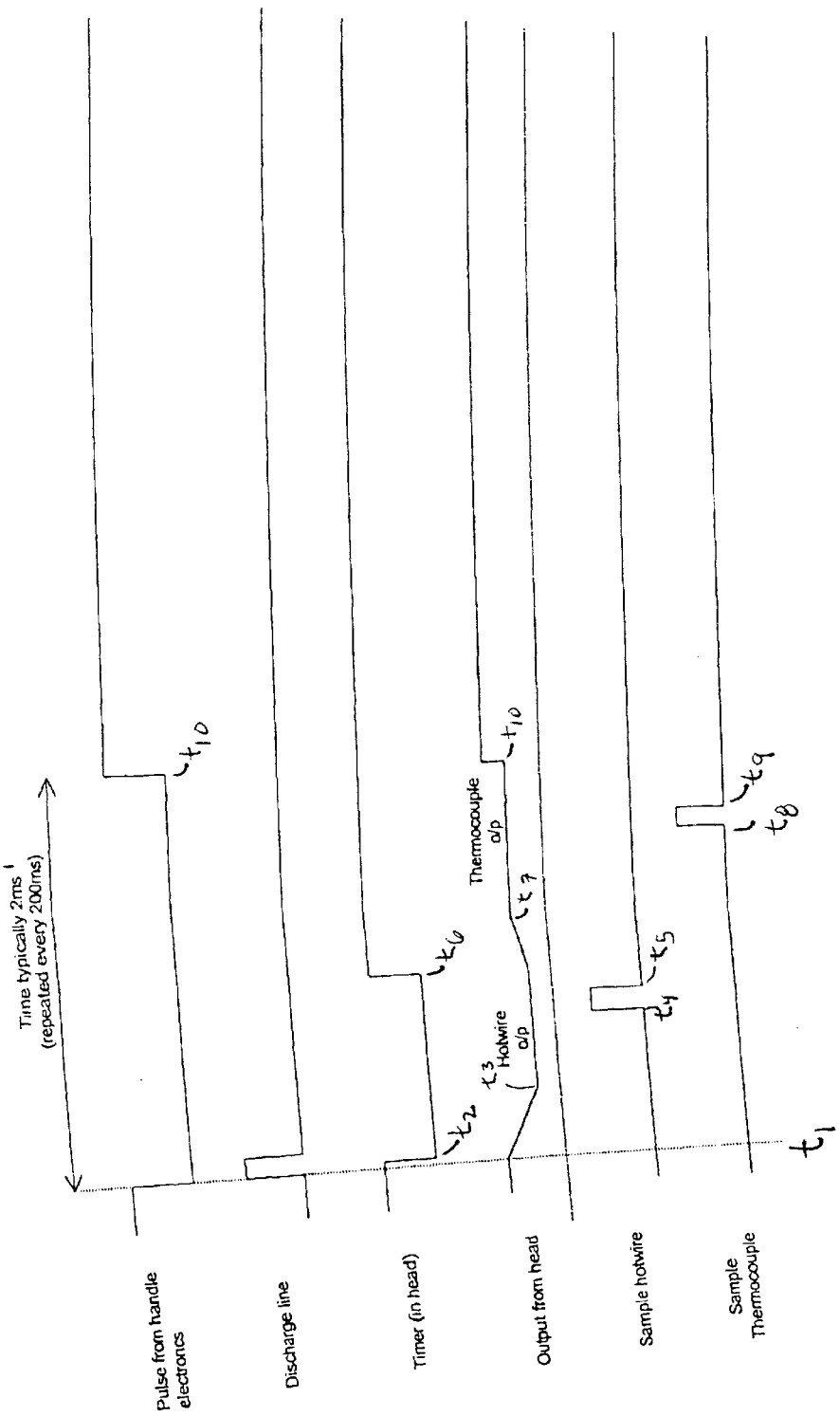
FIG. 7 is a diagram illustrating a sample timing sequence for the embodiment of the inventive device shown in FIG. 1.

FIG. 7 is a diagram illustrating a sample timing sequence for this embodiment. Trigger pulse driver 172 provides pulse to sensor electronics 24. Power is transferred to sensor electronics 24 and is stored in power supply 174. To gather data from 24, the microprocessor 156 causes pulse driver 172 to remove power (t1) and apply a low resistance across the circuit for a short duration to discharge the line (t2). This event is detected by the trigger pulse detector 176 which begins timer 158. At t2, the Multiplexor switch 164 will connect the voltage from Hotwire sensor conditioning 168 to the line 114. The line voltage stabilizes during period t3. Between t4 and t5, the microprocessor 156 causes sample and hold 178 to capture the voltage and present it to Analog to digital convertor 162. These events occur while timer 158 is still running. At t6, timer 158 completes its timing interval and switches multiplexor switch 164 over to the thermocouple signal conditioner 170 to connect its voltage to the line 114. The line voltage changes and staibilizes at t7. At t8 to t9, the microprocessor 156 retriggers sample and hold 178 to acquire the thermocouple voltage. This voltage is stored and will be transferred to the analog to digital convertor 162 when it completes the previous conversion. At t10, the microprocessor 156 causes pulse driver 172 to re-apply power to the line to begin the next cycle. The power supply 174 maintains power for the sensor electronics 24 from t1 to t10 and will be recharged after t10.

Timing sequencer 58 can also be programmed directly from computer 54. When initiated, timing sequencer 58 energizes sensor assembly 22 for a predetermined amount of time to allow the hot wire to reach its correct operating temperature. The hotwire in hot wire sensor 46 is heated to approximately 130 Degrees Celsius. This heating occurs when the anemometer 10 is turned on. Once the operating temperature is reached, data acquisition routine 60 is then prompted to receive and process signals from electronics assembly 24 in probe head 20. Airflow is calculated by measuring the voltage required to maintain the hot wire at 130 degrees Celsius. The greater the airflow across the sensor 46, the more power (and thus more voltage) required. Temperature sensor 38 is used to compensate the air speed calculation for errors introduced when the usage temperature varies from the temperature the anemometer is initially calibrated at. Sensor 48 is also used to directly display the measurement temperature.

Data acquisition routine 60 decodes the signals sent by electronics assembly 24 into separate analog signals which are then converted by analog-to-digital converter 62 and read by microprocessor 56. This process is repeated until probe head 20 is switched off. Microprocessor 56 synchronizes the analog-to digital convertor 62, timing sequencer 58 and data acquisition routine 60 to capture readings at the correct time.

Signals received by data acquisition routine 60 are generated from data retrieved by sensor assembly 22 and conditioned by electronics assembly 24 before being transferred through extendable portion 14. In this embodiment, electronics assembly 24 comprises time dependant multiplexor 64 and sensor signal conditioner 66. Multiplexor 64 encodes signals from hot wire sensor 46 and temperature sensor 48 in sensor assembly 22. The combined signal is then sent via inner and outer sections 26 and 28 to electronics assembly 18 in handle 12 using a form of time domain multiplexing. Sensor signal conditioner 66 provides an interface to sensors 46 and 48 and also amplifies and conditions the signals before they are passed to multiplexor 42 for encoding and subsequent transmission to electronics assembly 18 in handle 12.

Figure 8:
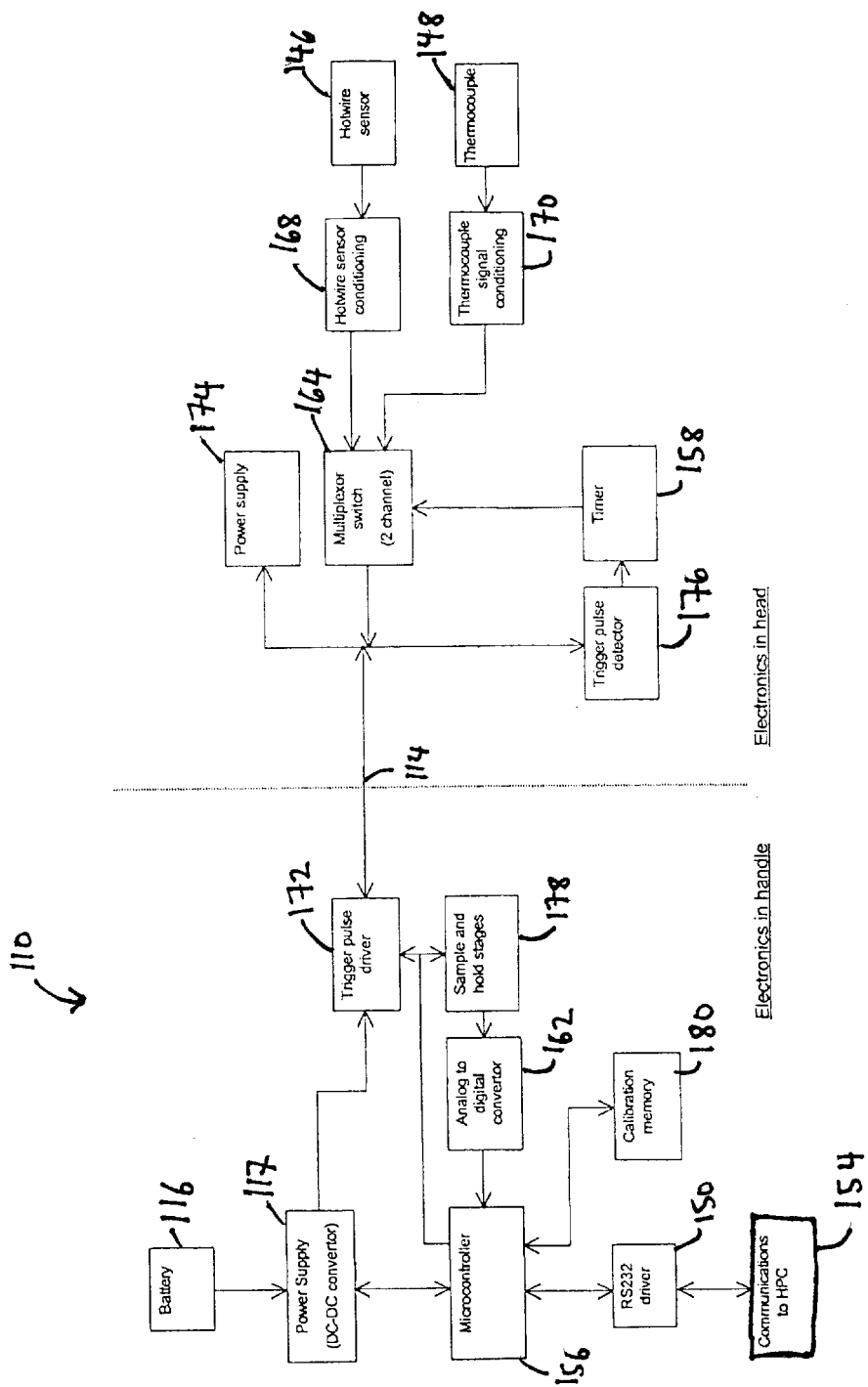
FIG. 8 is a functional diagram of the electronics assemblies for another embodiment of the inventive device.
Figure 12:
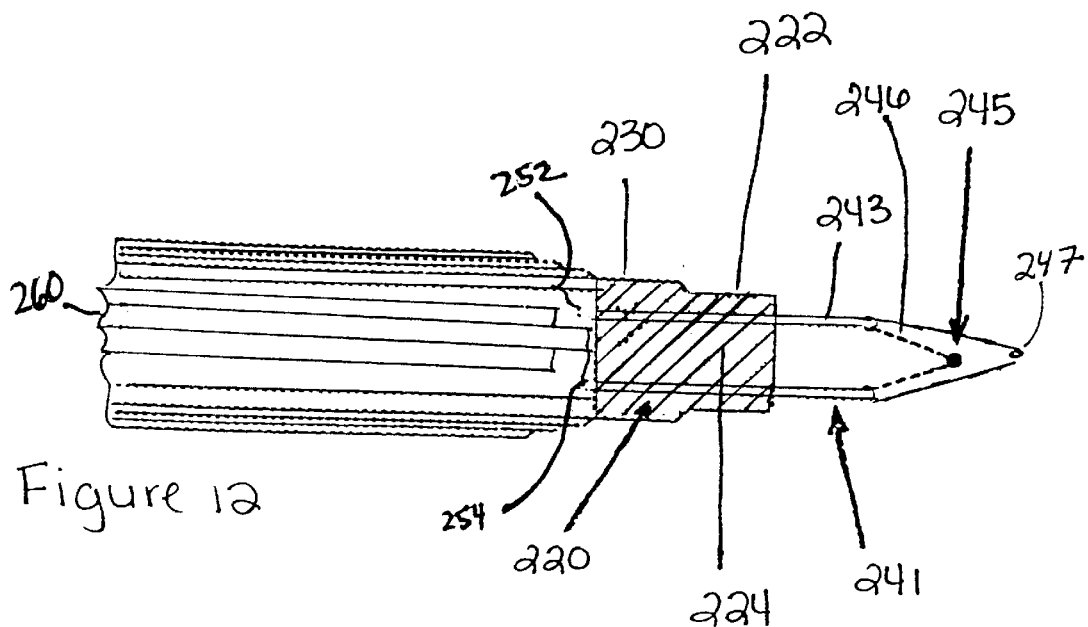
FIG. 12 is an enlarged top view of the sensor head of the embodiment illustrated in FIGS. 9 and 10.
Figure 13:
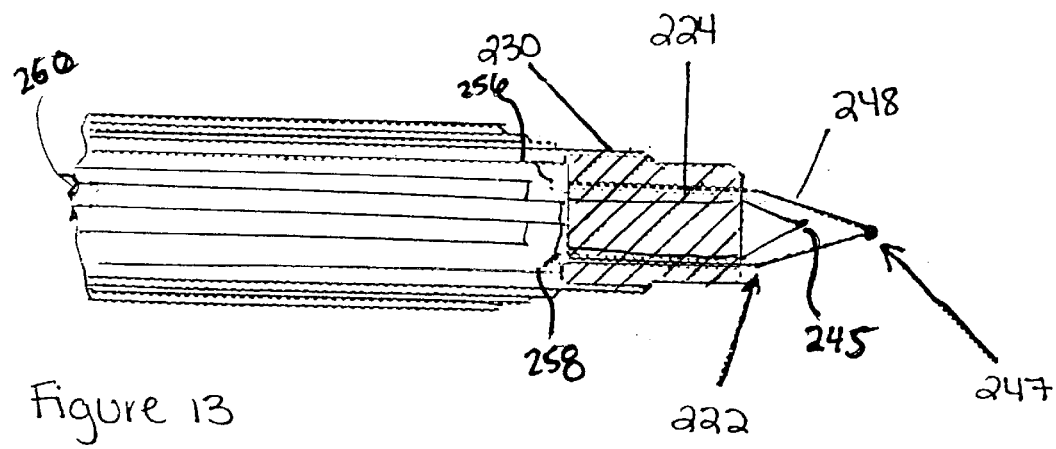
FIG. 13 is an enlarged bottom view of the sensor head of the embodiment illustrated in FIGS. 9 and 10.

Sensor signal conditioner 66 may include two conditioners, as shown in the embodiment in FIG. 8, a hot wire conditioner 168 and a thermocouple conditioner 170 for data from hot wire sensor 146 and thermocouple 148.

Turning on anemometer 110 initiates battery 116 which supplies the power supply 117 in handle 112. The cable to the computer has several conductors. Three conductors are used for communications (in, out and ground). Two other conductors can be used to provide power to the probe. The power supply 117 will automatically disconnect the internal battery and switch over to external power if available.

Trigger pulse generator 172 initiates a pulse and transfer of power to probe head 120 through extendable portion 114. Power supply 174 maintains and provides power to electronics and sensors 122 and 124 in probe head 114. Trigger pulse detector 176 detects the initial pulse from generator 172 and initiates timer 158, which sets the timing sequence for two-channel multiplexor switch 164 to collect data from sensor conditioners 168 and 170. Sensor conditioners 168 and 170 retrieve raw data from sensors 146 and 148, respectively. Data is transferred from multiplexor 164 through extendable portion 114 into electronics assembly 118 in handle 112, where it is temporarily held in memory 178 before being converted from analog to digital by converter 162 and processed by microcontroller 156. Initial readings are typically used for calibration purposes and stored in memory 180. Readings may also be transferred through an interface with personal computer 154 via a driver such as RS232 driver 150 as illustrated in this embodiment.

In an alternative embodiment, as illustrated in FIG. 9, Anemometer 210 has a handle 212 and an extendable portion 214. A battery and its compartment, and electronics assembly are located in handle 212 as in the previous embodiment. Probe 220, with sensor assembly 222 and a second electronic assembly 224 inside, is secured in anemometer 210 at the end of extendable portion 214. Extendable portion 214 has an outer telescoping section 226 and inner telescoping section 228. As in the previous embodiment, outer telescoping section 226 is electrically grounded and inner telescoping section 228 is electrically isolated from outer telescoping section 226, thus providing for conduction of electricity through extendable portion 214 and sensor assembly 222. As described in the previous embodiment, both inner telescoping section 226 and outer telescoping section 228 are made up of a plurality of annular pipe-like legs that allow the sections to extend and retract to reach into a flow of fluid. Sensors 245 and 247 are soldered on the top 252 and 254 and bottom 256 and 258 to a pads on a printed circuit boards 260. Board 260 having 2 pads on the top surface and 2 pads on the bottom surface.

In this embodiment, sensor assembly 222 in probe head 220 includes a hot wire sensor bead 245 and two connecting wires 246.

Sensor assembly 222 also includes a temperature sensor 248 with a welded thermocoupler sensor junction 247 for measuring the surrounding air temperature. The temperature reading from temperature sensor 248 is used predominantly for adjusting and calibrating hot wire sensor 245.

Hot wire bead 245, and thermocoupler 247 are masses of material, preferable substantially spheroid, with a size of 0.5 mm diameter, made of glass encapsulated platinum wire with a 10m W/K dissipation factor. The spheroid shape allows the gases or liquids to flow over the surface in a more even manner and with less turbulence than an irregularly shaped mass or wire. Additionally, by knowing the mass of bead 245 and the physical characteristics of its materials, more accurate calculations can be obtained than with an irregularly shaped wire or wire. Temperature sensor 248 is of a conventional K type thermocoupler design, typically having a diameter of 0.2 mm, and made of Nickel Chromium/Nickel Aluminum, and having a bead of diameter of 0.5 mm, made by welding the two wires together to give approximately 40 $\mu$V/°C characteristics of the material.

In use, ambient and flow air are measured simultaneously. Typically, the technician first connects the probe to the HPC and extends the probe to allow the probe head to be paced in the air flow to be measured.

Next the technician switches on and waits a few seconds for the probe to stabilize. The probe is then placed in the air flow and rotated so that the air flows across the sensor without being obscured by the protective cover, then the technician reads the corresponding air flow and temperature. The built in averaging, min/max and logging functions of the HPC can be used in desired.

While illustrative embodiments of the invention have been described above, it is, of course, understood that various modifications will be apparent to those of ordinary skill in the art. Many such modifications are contemplated as being within the spirit and scope of the invention.

What is claimed is:

1. An anemometer, comprising:
   (a) a support member;
   (b) a data collection device;
   (c) an extendable portion having a first end and a second end, said second end being connected to said support member, said extendable portion comprising at least two extendable self-supporting conductors for transferring electricity and power to said data collection device said data collection device being connected to said first end of said extendable portion for collecting data at said first end, said extendable self-supporting conductors being adjustable through a range of lengths and said extendable self-supporting conductor being of stable length at a plurality of lengths in said range; and (d) a data processing device coupled to said data collection device for sending command data and receiving collected data from said data collection device.

2. An anemometer as in claim 1, wherein said data processing device is located within said support member.

3. An anemometer as in claim 1, wherein said data processing device is a computer.

4. An anemometer as in claim 1, further comprising a power source located within said support member.

5. An anemometer as in claim 1, wherein said a support member is suitable for being grasped by the hand of a user.

6. An anemometer, comprising:
(a) a support member;
(b) a transducer; and
(c) an extendable portion, said extendable portion comprising at least two extendable conductive members each having a first end and a second end, said transducer being coupled to said first ends of said extendable conductive members for coupling data collected by said transducer at said first end, said second ends of said extendable conductive members being connected to said support member,
wherein said two extendable conductive members comprise an inner telescoping section and an outer telescoping section, said inner section being contained within said outer section and said inner telescoping section having a smaller diameter than said outer telescoping section.

7. An anemometer as in claim 6, wherein said telescoping sections are electrically insulated from each other, said outer telescoping section being electrically grounded.

8. An anemometer, comprising:
(a) a support member;
(b) an electrical transducer for generating data in the form of an electrical signal;
(c) a data utilization device; and
(d) an extendable portion, said extendable portion comprising at least two electrically conductive extendable self-supporting conductive members, each of said self supporting conductive members having a first end and a second end, said transducer being coupled to said first ends of said extendable conductive members for coupling said electrical signal generated by said transducer, said second ends of said extendable conductive members being connected to said support member and said second ends of said extendable conductive members coupling said electrical signal to said data utilization device.

9. An anemometer as in claim 8, wherein said transducer comprises a hot wire sensor and/or an ambient temperature measuring device.

10. An anemometer as claimed in claim 9, wherein said hot wire sensor and/or said ambient temperature measuring device have a mass of material disposed on its furthermost point from said support member.

11. An anemometer as claimed in claim 10, wherein said mass of material is of a composition such that its physical characteristics are known.

12. An anemometer as claimed in claim 10, wherein said mass of material is substantially spherical in shape.

13. An anemometer as claimed in claim 9, wherein said hotwire sensor comprises a metal or metal alloy.

14. An anemometer as claimed in claim 9, wherein said hotwire sensor comprises tungsten and platinum alloys.

15. An anemometer as claimed in claim 9, wherein said hotwire has a diameter of 2–20 microns.

16. An anemometer as in claim 8, wherein said support member comprises a handle.

17. An anemometer as in claim 8, wherein said transducer is located at said first end of said extendable conductive members.

18. A method for using an anemometer, comprising:
(i) a support member;
(ii) a data collection device;
(iii) an extendable portion having a first end and a second end, said second end being connected to said support member said extendable portion comprising at least two conductors for transferring electricity and power to said data collection device, said data collection device being connected to said first end of said extendable portion for collecting data at said first end, said conductors and said data collection device forming a sensor assembly; and
(iv) a data processing device coupled to said data collection device for sending command data and receiving collected data from said data collection device, said method comprising:
(a) extending said extendable members to a desired length;
(b) rotating a sensor assembly to a desired position;
(c) turning on said apparatus;
(d) placing said apparatus in a fluidic stream whose velocity is to be measured;
(e) receiving raw data from said apparatus.

19. A method as claimed in claim 18, wherein turning on said apparatus causes:
(a) a timing sequencer to energize, said timing sequencer energizing said sensor assembly, said energizing of said sensor assembly causing a hot wire associated with said hot wire sensor to be heated to its operating temperature; and
(b) once said operating temperature is achieved, a data acquisition routine is initiated, said data acquisition routine receiving and processing data from said sensor assembly.

20. A method as claimed in claim 19, wherein said operating temperature being approximately 130 degrees Celsius.

21. A method as claimed in claim 18, wherein said sensor assembly comprises a hot wire sensor and an ambient temperature sensor, said ambient temperature sensor being used to calibrate said hot wire sensor.

22. A method as claimed in claim 18, further comprising:
(f) processing said raw data with a microprocessor to calculate flow data, said flow data being calculated by measuring the current required to maintain the hot wire at its operating temperature.

23. An anemometer comprising:
(a) a support member;
(b) a transducer;
(c) an extendable portion, said extendable portion comprising at least two extendable conductive members each having a first end and a second end, said transducer being coupled to said first ends of said extendable conductive members for coupling data collected by said transducer at said first end, said second ends of said extendable conductive members being connected to said support member; and (d) a data processing device, wherein said transducer comprises a hot wire sensor and an ambient temperature sensor, said hot wire sensor being coupled to said data processing device, and said ambient temperature sensor being coupled to said data processing device to calibrate said hot wire sensor, said data processing device being configured to receive the output of said hot wire sensor and said ambient temperature sensor and produce an output indicating fluidic speed.

* * * * *